Figure 1:
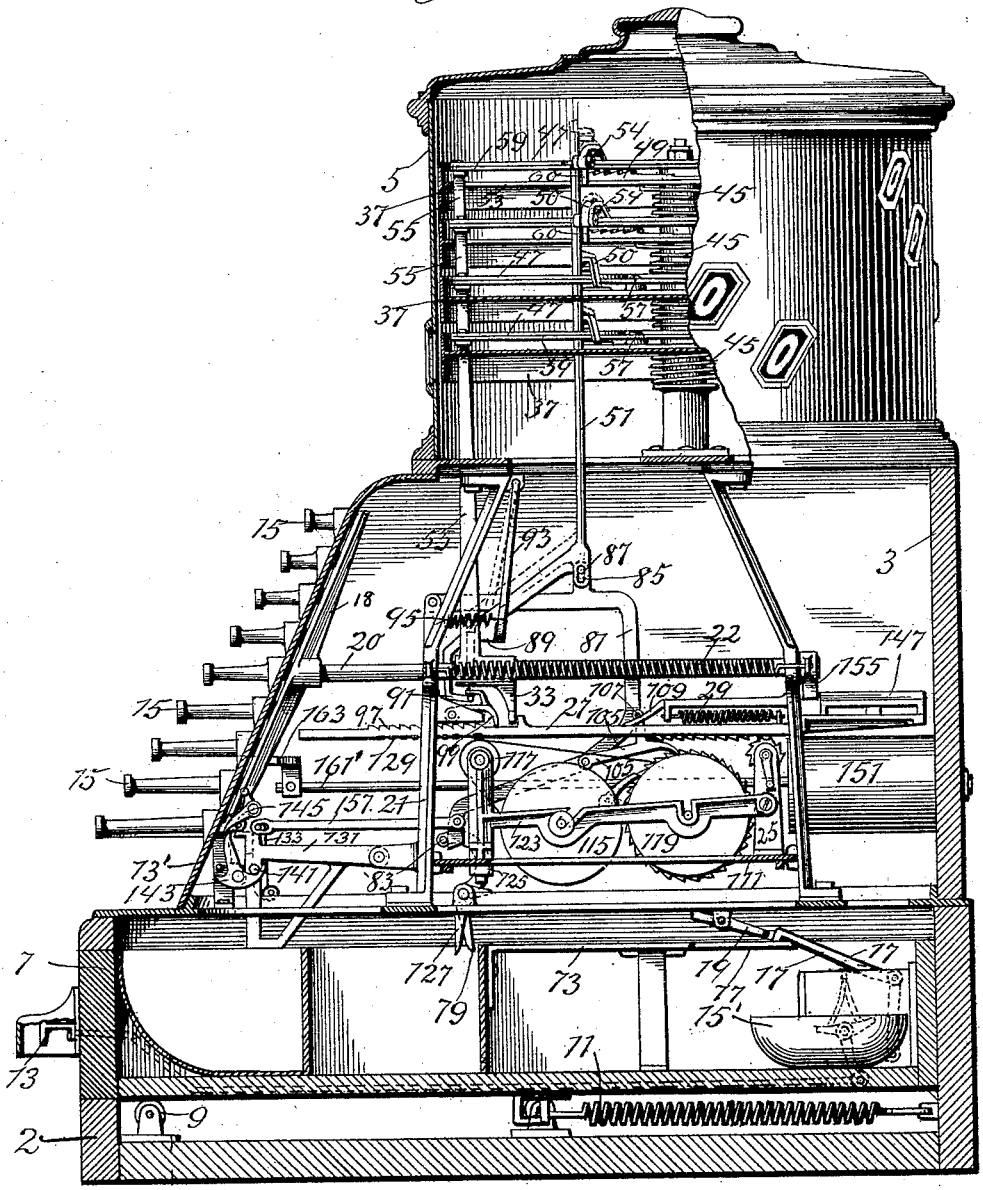

(No Model.) 8 Sheets—Sheet 1.

P. J. LANDIN & F. L. WALKER.
CASH REGISTER, INDICATOR, AND RECORDER.

No. 526,400. Patented Sept. 25, 1894.

Witnesses:
J. Jessen.
C. E. Van Doren.

Inventors:
Peter J. Landin
Fletcher L. Walker
By Paul A. Mirium attys (No Model.) 8 Sheets—Sheet 2.
P. J. LANDIN & F. L. WALKER.
CASH REGISTER, INDICATOR, AND RECORDER.
No. 526,400. Patented Sept. 25, 1894.

Witnesses:
J. Jensen.
C. E. Van Doorn.

Inventors:
Peter J. Landin
Fletcher L. Walker.
By Paul & Merwin attys.

(No Model.) 8 Sheets—Sheet 3.
P. J. LANDIN & F. L. WALKER.
CASH REGISTER, INDICATOR, AND RECORDER.
No. 526,400. Patented Sept. 25, 1894.
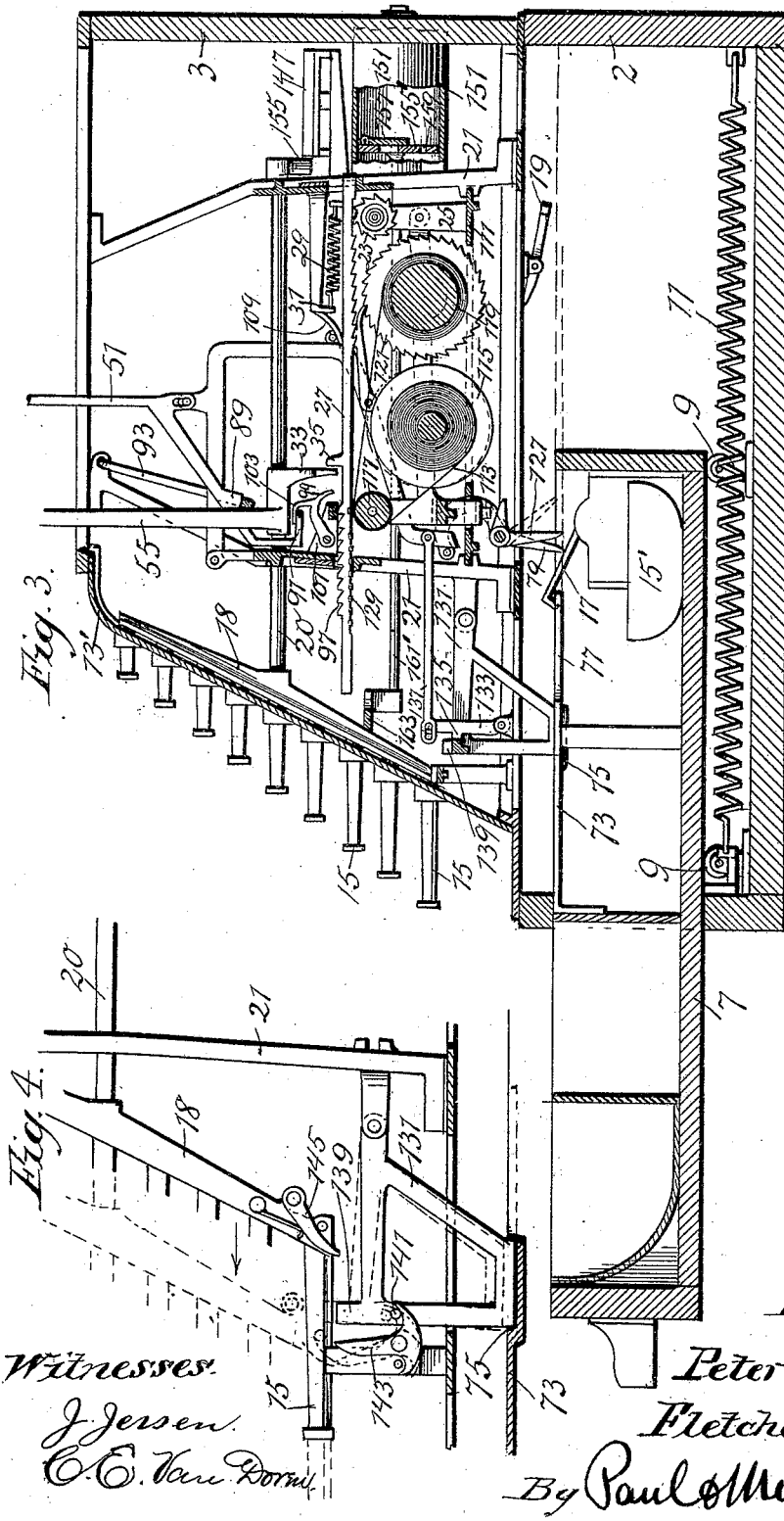

(No Model.) 8 Sheets—Sheet 4.

P. J. LANDIN & F. L. WALKER.
CASH REGISTER, INDICATOR, AND RECORDER.

No. 526,400. Patented Sept. 25, 1894.

Witnesses.
J. Jessen.
C. E. Van Dorn.

Inventors.
Peter J. Landin
Fletcher L. Walker
By Paul A. Merwin attys.

(No Model.) 8 Sheets—Sheet 5.

P. J. LANDIN & F. L. WALKER.
CASH REGISTER, INDICATOR, AND RECORDER.

No. 526,400. Patented Sept. 25, 1894.

Witnesses:
J. Jessen
C. E. Van Doren

Inventors:
Peter J. Landin
Fletcher L. Walker
By Paul A. Merwin attys

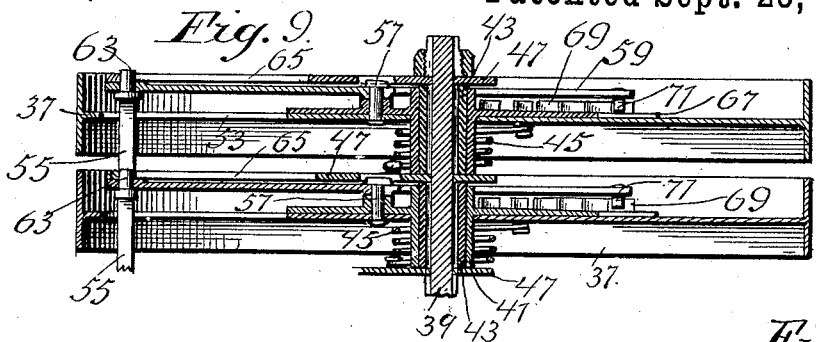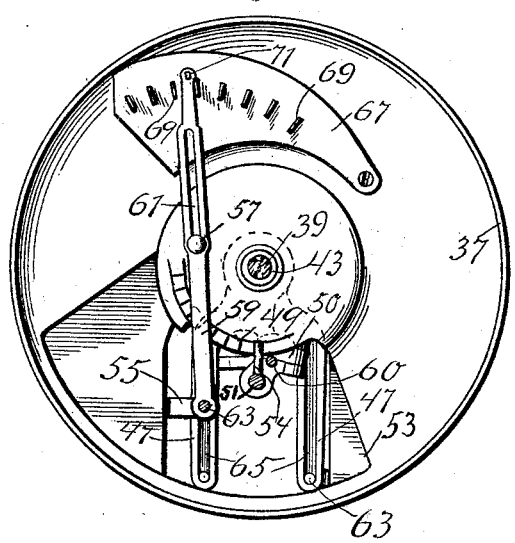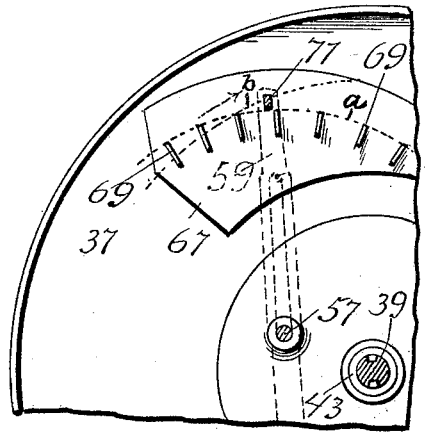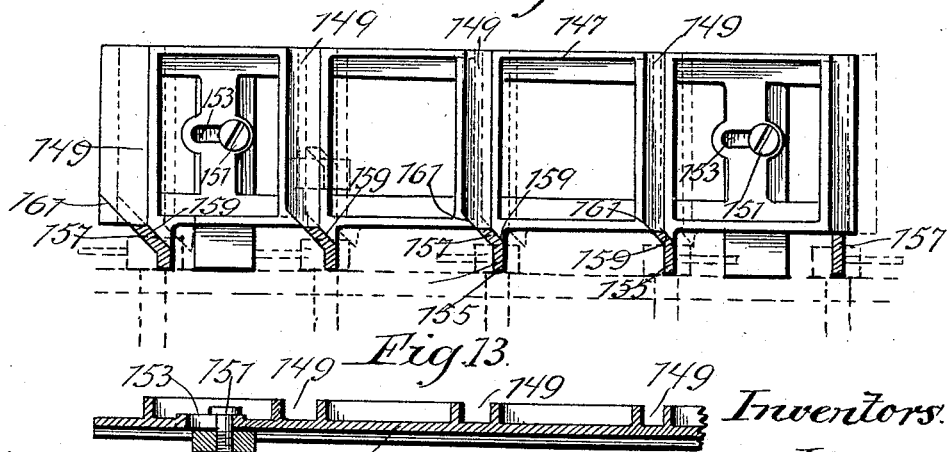

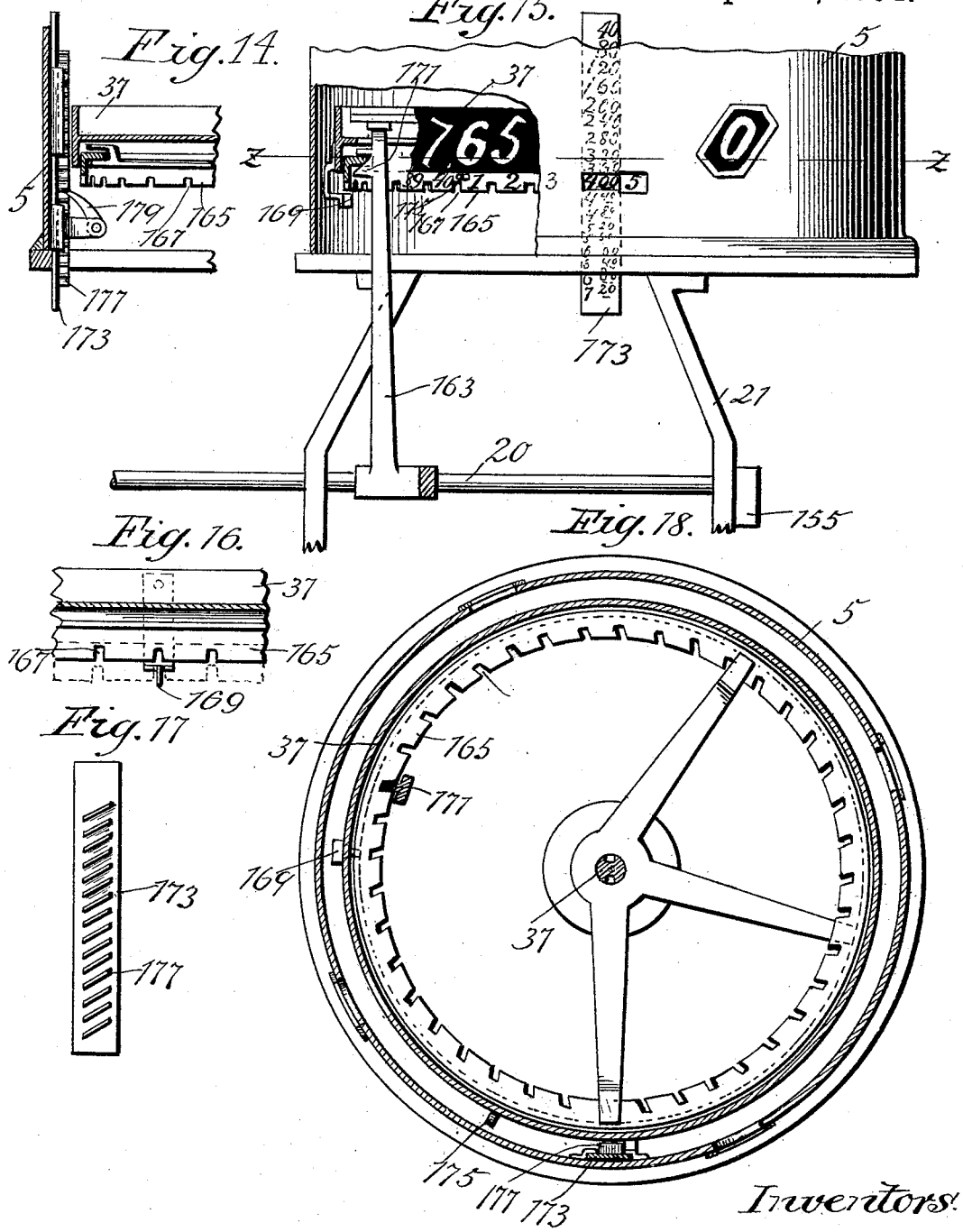

(No Model.) 8 Sheets—Sheet 8.
P. J. LANDIN & F. L. WALKER.
CASH REGISTER, INDICATOR, AND RECORDER.
No. 526,400. Patented Sept. 25, 1894.
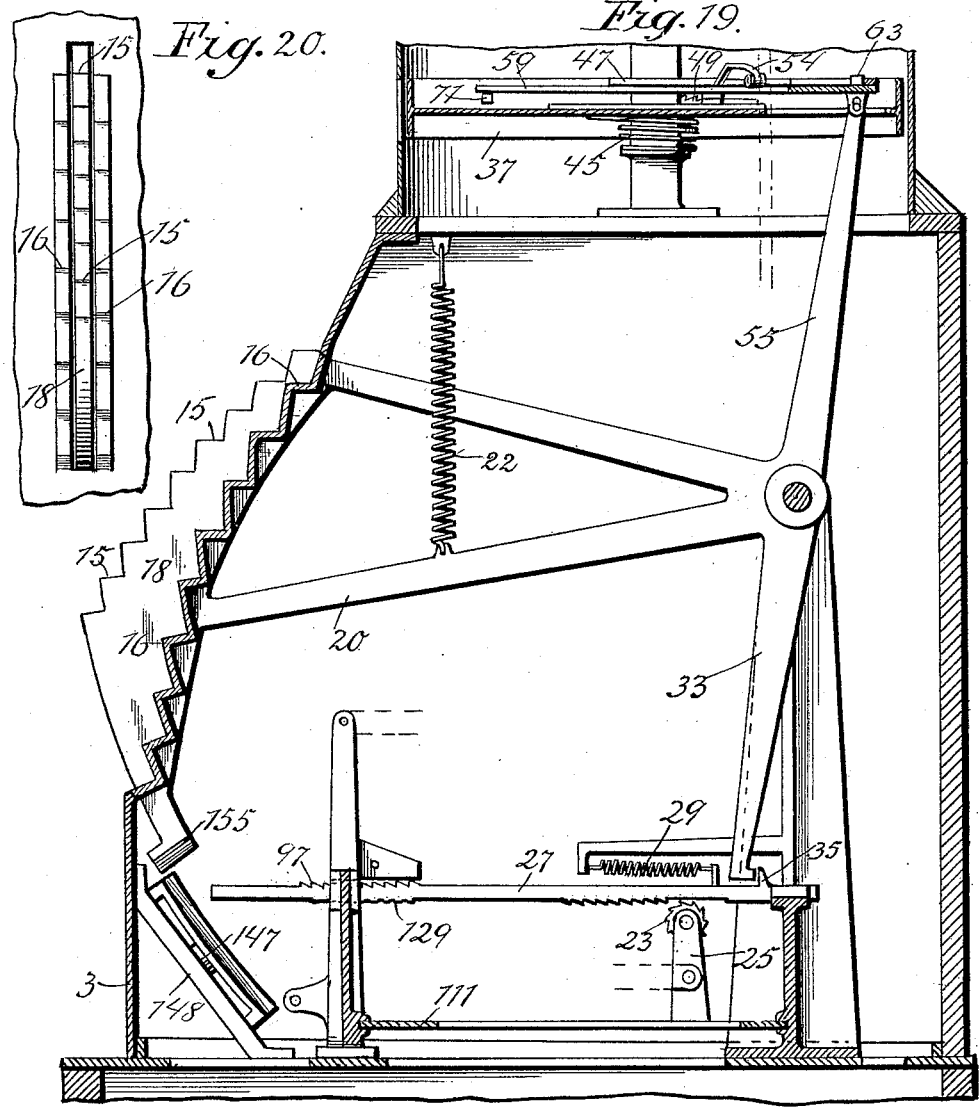
Witnesses:
J. Jensen
C. E. Van Doren
Inventors:
Peter J. Landin
Fletcher L. Walker
By Paul Merwin attys
THE NORRIS PETERS CO., PHOTO-LITHO., WASHINGTON, D. C.

UNITED STATES PATENT OFFICE.

PETER J. LANDIN AND FLETCHER L. WALKER, OF MINNEAPOLIS, MINNESOTA, ASSIGNORS TO THOMAS B. WALKER AND SARAH E. WILSON, OF SAME PLACE.

CASH REGISTER, INDICATOR, AND RECORDER.

SPECIFICATION forming part of Letters Patent No. 526,400, dated September 25, 1894.

Application filed November 2, 1891. Serial No. 410,582. (No model.)

*To all whom it may concern:*

Be it known that we, PETER J. LANDIN and FLETCHER L. WALKER, of Minneapolis, in the county of Hennepin and State of Minnesota, have invented certain Improvements in Cash Indicators, Registers, and Recorders, of which the following is a specification.

This invention relates to mechanisms designed for indicating, registering and recording the amounts of cash sales or other transactions, and the objects we have in view are, first, to provide a machine in which the amount of each sale will be indicated so as to be seen both by the seller and the purchaser, and will preferably be shown at four different places so that the indication will be visible from the front or the rear or either side of the machine, and the amount of the sale or transaction will be registered on a mechanism that carries or registers the total of the sales, and a permanent record of each sale will also be made; second, to provide a machine in which sales of any amount from one cent up to one hundred dollars or more may be indicated, registered and recorded; third, to provide a machine in which the keys or operating devices may be operated in any order; fourth, to provide a machine having a mechanism for recording the name or some character indicating the person or salesman who has operated the machine, or indicating the class of goods that has been sold or the kind of transaction that has been made, and connecting this device with the other mechanisms so that after each sale or transaction this recording device must be operated before the machine can be returned to its normal position; fifth, to provide a machine in which the registering wheels and recording device are mounted upon a separate removable frame or drawer so as to be capable of being readily removed from the machine for inspection; sixth, to provide a machine in which the operating keys or devices are always locked when the cash drawer is closed, so that by providing a suitable lock on the cash drawer, as for example, a combination lock, there will be no possibility of tampering with the machine by unauthorized persons, but it will be necessary to unlock and open the cash drawer before the other mechanisms can be operated; and seventh, to provide a machine that consists of but few parts and is simple in construction and easy in operation.

Other objects of the invention will appear from the following detailed description taken in connection with the accompanying drawings, in which—

Figure 2:
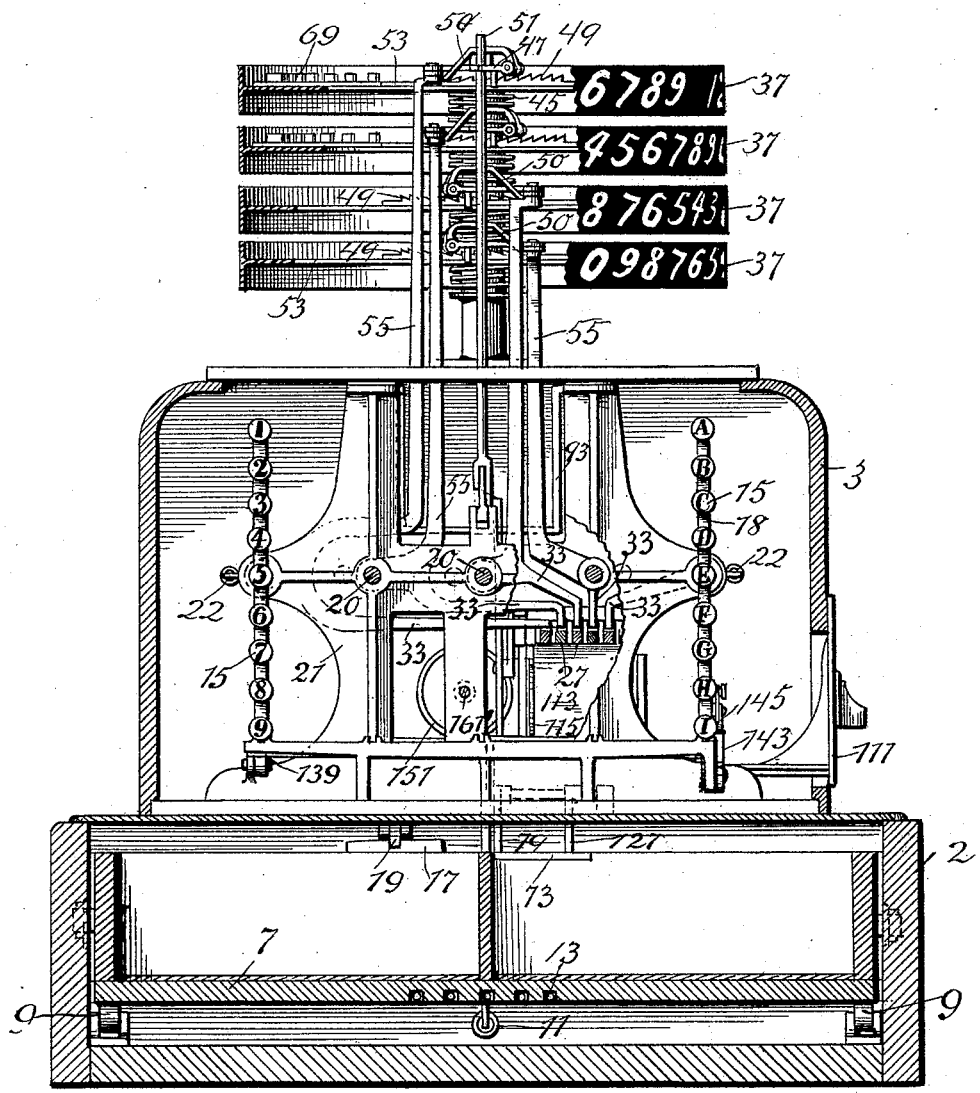
Figure 5:
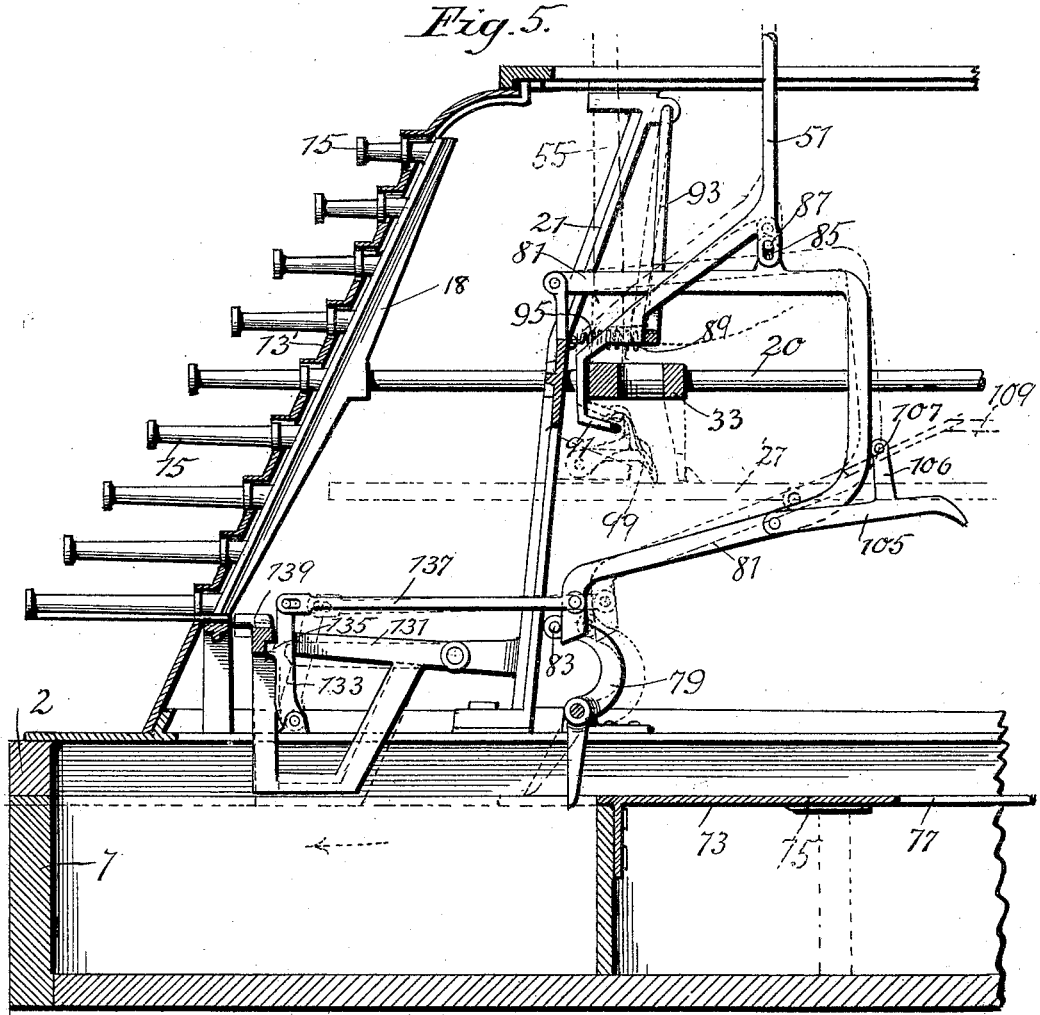
Figure 6:
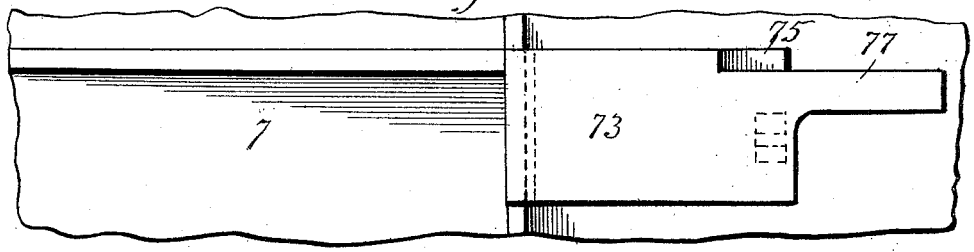
Figure 7:
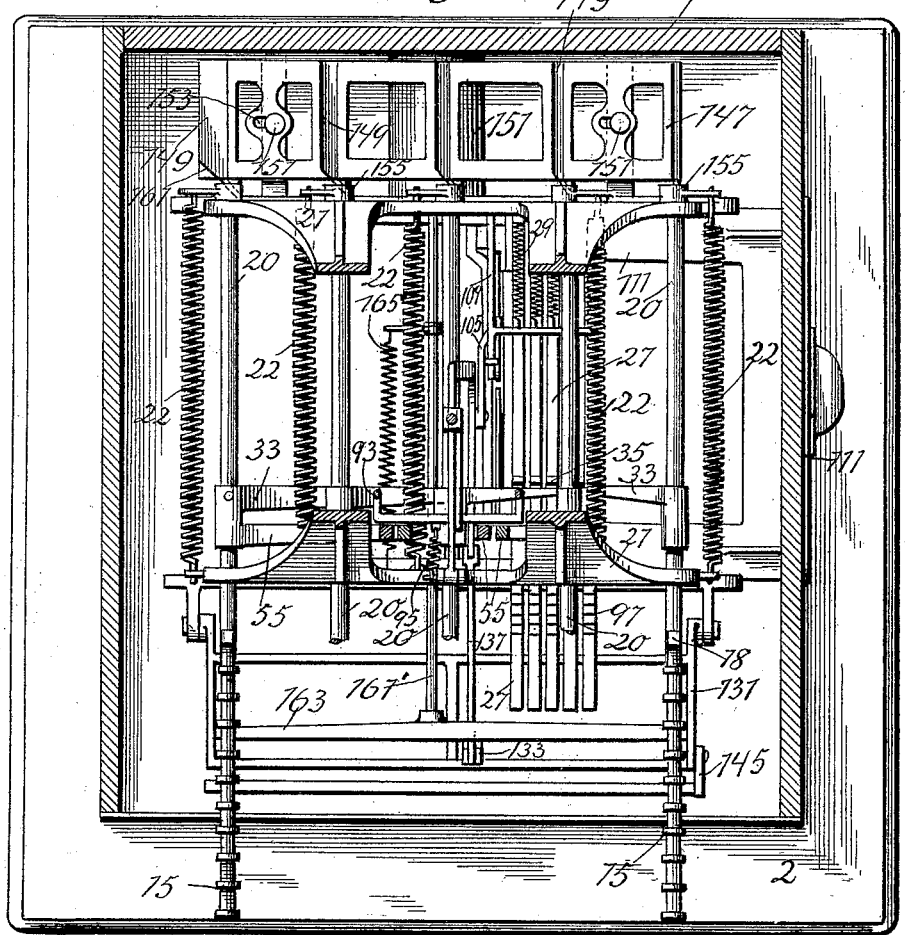
Figure 8:
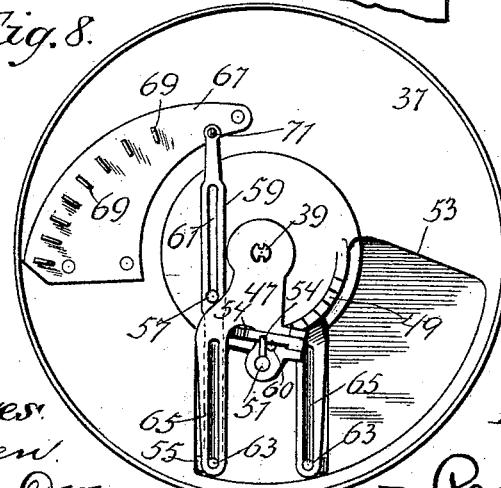

Figure 1 is a side elevation of our improved machine with a portion of the casing broken away to show the interior mechanism and with the cash drawer and parts of the mechanism in section. Fig. 2 is a front elevation partly in section with the casing and cash drawer in section and with the casing that incloses the indicating wheels omitted, and with said wheels partly in section. Fig. 3 is a vertical section of the lower part of the machine showing the cash drawer open. Fig. 4 is a detail of the means for locking the drawer in its open position and releasing it after the last key slide is operated. Fig. 5 is a vertical section of a portion of the machine showing the cash drawer also partly in section. Fig. 6 is a detail of a portion of the cash drawer. Fig. 7 is a horizontal section of the machine showing the key slides and a part of the keys. Fig. 8 is a plan view of the indicating wheels and the means for operating them. Fig. 9 is a vertical section of two of the indicating wheels. Fig. 10 is a plan view of the indicating wheels showing one of the wheels operated upon. Fig. 11 is a plan view of a portion of one of said wheels and the stop for said wheel. Figs. 12 and 13 are details of the means for locking the key slides so as to prevent more than one key slide from being operated at a time. Figs. 14, 15, 16, and 17 are details of a modified construction of the registering device that may be used in connection with the machine. Fig. 18 is a plan section on line z—z of Fig. 15. Fig. 19 is a detail section showing a modified arrangement of key bar. Fig. 20 is a detail front elevation of the same.

In the present invention we provide a machine in which all of the operating keys will be locked until the cash drawer is opened by a person having access thereto, preferably by means of the combination lock with which the drawer is provided. The machine can therefore not be operated until the cash drawer has been opened by some person having the combination, or, when the drawer is locked by any other kind of lock having means for opening it. After the cash drawer is opened the key slides may be operated to register the amount of a sale or transaction. An independent key bar is preferably provided that has a series of characters and this key bar is operated by the salesman or person operating the machine, so as to record on the recording device, with the amount of the transaction, the identifying mark by which the transactions indicated, registered and recorded by him are designated, so as to show the person operating the machine for each transaction or showing the class of goods or character of transaction. Upon operating this key bar the cash drawer is released and is automatically closed. The keys are then all locked simultaneously with the closing of the cash drawer by the operation of one of the key bars, and the machine cannot be again operated until the cash drawer is again opened.

The machine indicates the transaction upon the indicating wheels. It registers each transaction upon a suitable registering or adding device, which carries the total of all of the transactions, and it makes a permanent record of each transaction together with an identifying mark showing the person who operates the machine for each transaction or showing the class of goods or kind of transaction.

In the drawings, 2 represents the casing within which the cash drawer is located. 3 represents the casing in which the registering and recording mechanisms are located, and 5 represents the casing or tower within which the indicating wheels are located.

The cash drawer 7 is of any suitable size and construction and it is preferably arranged to slide upon suitable rolls 9, and is provided with a coil or spiral spring 11 by which, when it is released after each operation, it will be returned to its normal or closed position. This cash drawer is preferably provided with the combination lock 13 of any suitable construction, and this lock must be operated before the cash drawer can be opened. The drawer is also preferably provided with a suitable gong or alarm 15' that is connected to the combination lock in the usual way so that in case an attempt is made to open the cash drawer by any person not having the combination said alarm will be sounded. The drawer is preferably provided with the pivoted plate or dog 17, Figs. 1 and 3, which, when the drawer is closed, comes opposite the pivoted dog 19, thereby locking said drawer in its closed position.

The dog 17 is connected with and is a part of the combination lock 13, so that when the proper combination is made said plate 17 will be moved out of contact with the dog 19 and the drawer may be opened.

Arranged in the casing 3 is a mechanism for registering and recording the amount of sales, and also the mechanism for operating the indicating wheels that are located in the upper casing or tower. The casing 3 is preferably provided with an inclined forward wall 13' and through this wall project the keys 15, there being preferably nine keys in each series, and these keys project different distances through said wall, the upper key being preferably the shortest and the others increasing in length to the lower one which is the longest. All of these keys are secured to or connected with a key-bar 18 arranged within the wall 13' and in turn connected to a key slide 20. This slide is arranged to move in bearings in the standards 21.

We prefer to provide a series of keys and a corresponding number of key bars and slides, one of said key bars being used for indicating units, one for tens, one for hundreds and one for thousands, and the fifth one being used for registering and recording the initial or identifying mark of the clerk or salesman using the device or the kind of goods or transaction and releasing the cash drawer so as to permit it to close and thereby to lock all of the keys and key-bars. The registering wheels 23, Figs. 1 and 3, are mounted in suitable standards 25 arranged within said casing 3, and these wheels are provided with a series of ratchet teeth and are operated by sliding ratchet bars 27 mounted so as to slide in suitable supports in the standards 21. These bars are preferably arranged so as to be parallel with each other and so as to be in close proximity to each other, as shown in Fig. 2.

The construction and arrangement of the wheels 23 we have not shown in detail in this application, said wheels being preferably the same as shown in the application of Peter J. Landin for improvement in computing machines, filed February 3, 1891, Serial No. 379,966.

Each of the sliding bars 27 is provided with a corresponding series of ratchet teeth so that as said bars are moved inward they engage and operate said registering wheels, and the distance that said bars are moved determines the movement of said wheels. As the bars are moved in one direction they operate said wheels, and as they are reversed they pass over said wheels without moving them. For the purpose of reversing the movement of said bars we provide the springs 29 that are connected to said bars and to the stationary lugs 31 upon the standards 21. For operating the bars 27 each of the sliding bars 20 is provided with a projecting arm 33 and said arms extend into position to engage a projection 35 on said bars 27.

It will be seen that the movement of the slides 20 will depend upon the key that is operated. If the upper key in a series is operated said bar is moved a sufficient distance to move the bar 27 just far enough to turn the registering wheel one tooth or notch. If the second key is operated it is turned two notches, and so on. These registering wheels are arranged so as to register the total of the sales or transactions indicated by the machine, and the registering wheels are arranged so as to carry from one to the other as in the computing machine hereinbefore referred to. The slides 20 through which the bars 27 are operated also operate the indicating device and thereby the machine is set to indicate the amount of each purchase or transaction.

We provide in the upper casing or tower 5 a series of indicating wheels preferably four in number, and each of said wheels is preferably provided with four series of figures or characters upon its circumference, and said casing is provided with a corresponding number of openings for each wheel through which the figures on said wheels may be read. The openings are preferably placed in inclined rows so that the indications read from left to right in the usual way of reading numbers, but the left hand figure for each reading is near the top of the casing while the right hand figure is near the lower part of the casing.

The indicating wheels 37 are mounted upon a stationary post or shaft 39, said post being provided with a series of plates 47 splined to said post upon which said wheels are supported. Each wheel is provided with a hub 41 and a collar or sleeve 43 is arranged upon said post within the hub 41. Springs 45 are provided for each wheel, each of said springs being secured to the stationary plate 47 and to the wheel 37 and being preferably arranged to surround said post so that when said wheels are turned the tension of the springs is increased, and when the wheels are released the springs return them to their normal positions. Each wheel is provided with a ratchet 49 and a pawl or dog 50 is pivoted on each stationary plate 47, and a rod 51 extends through an opening 53 in each of said wheels, and is provided with pins 54 extending under the pawls 50. When the rod 51 is in its normal position the pawls or dogs 50 are in position to engage said ratchets 49, and when in this position said pawls engage said ratchets and hold said wheels in any position into which they may be turned. When said wheels are to be released the rod 51 is raised by means hereinafter described, and raises all of said pawls 50 from the ratchets on said wheels and then said wheels are returned to their normal positions by said spring dogs 45.

Each of the key slides 20 is provided with an upright arm or post 55, Figs. 1, 2, 3, 8, 9 and 10, that extends through the open portion 53 of the indicating wheels and is provided with means for operating said wheels. As these devices are all alike we will describe the device for operating one of said wheels only, it being understood that two of the wheels are preferably arranged to be turned in one direction and the other two wheels to be turned in the opposite direction, this arrangement being made simply for convenience and in this case the figures on the lower two wheels being arranged in the opposite direction from those of the upper wheels.

As before stated, each of said wheels is provided with an opening 53 through which the rods 51 and 55 extend, Fig. 10, these openings being of sufficient size to admit of the turning of said wheels without interfering with said rods. Each wheel 37 is provided at a point between its center and circumference with a stud 57, Figs. 8, 9, 10 and 11, and a link 59 is connected to the upright or rod 55 and is provided with a slot 61 through which said stud 57 extends. As the uprights 55 are connected to the key slides 20 they are moved inward by the operation of said key slides, and at the beginning of their operation they occupy substantially the position shown in Fig. 8. Each upright 55 is also preferably provided with a pin 63 that extends into a slot 65 in the plate 47. The plate 47 being stationary the pin 63 which is formed directly upon the upper end of the upright 55 forms a guide as it moves in said slot 65 for the end of the link 59, and thereby as said upright 55 is moved inward the wheel 37 is turned upon its axis, the limit of its movement being substantially a quarter of a revolution. As said wheel is turned the pawl or dog 50 engaging the ratchet 49 holds the wheel and prevents the spring from turning the wheel to its normal position until said pawl is released as hereinafter described. We also prefer to provide means which prevents the turning of said wheels 37 accidentally beyond the proper point, as might be done otherwise if the key slides were moved quickly and sufficient impetus were given to the wheels to cause them to turn beyond the desired point. For this purpose we provide upon each wheel a plate 67 having thereon a series of lugs or stops 69, Figs. 8, 9, 10 and 11. The end of the link 59 is provided with a downwardly projecting lug or stud 71, and when the wheel is in a normal position said stud 71 occupies a position in relation to said stops 69 substantially as shown in Fig. 8.

It will be observed that the link 59, when moved by the key slide 20 and the upright 55, has a compound motion, made up of a longitudinal motion in the direction of its length, which it receives directly from the upright 55, and a circular motion around the pin 63 as a center, which it receives from the pin 57 upon the wheel 37; and that, if the wheel 37 continues to revolve after the upright 55 has stopped, then the said link 79, will have only a circular motion around the pin 63.

The first movement of the wheel 37 and link 59 carries the stud 71 into position to stand in the path of the first stop 69. As the wheel 37 is turned on an axis, which is the center of the wheel, and the link 59 is turning upon the pin 63—which has only a rectilinear movement,—owing to its connection with the wheel through the stud 57 upon the wheel, the position of said stud 71 in relation to the stops 69 will be constantly changing. If both the link 59 and the wheel 37 are moving the stud 71 will pass by all of said stops 69 as indicated in Fig. 10 by the dotted line $a$ which indicates the line of movement. If, however, the link 59 is stopped, as it will be by the stoppage of the key slide and upright 55 and the wheel continue to move, then the said stud 71 will be encountered by the next lug 69 as indicated in Fig. 10 where the dotted line $b$ represents the path which the stud 71 would follow were the wheel thus to overrun. As soon as said wheel is stopped and the inward movement of the upright 55 ceases the key slides and keys will be returned to their normal positions by the springs 22 connected to said key slides, and the slot 61 in the link 59 will permit said link to be returned to its normal position to which it has been turned, the stud 71 passing between two of the projections 69, Figs. 10 and 11. As each of the slides is operated the corresponding wheel will be turned into position to show at each opening in the casing the figure or character corresponding to that of the key that has been operated.

As before stated the key slides are moved different distances by operation of the different keys, and the indicating wheels are correspondingly moved by the movement of said key slides, and when the upper key in each series is moved the corresponding indicating wheel is moved the shortest distance. As there are four series of figures upon each wheel and four sets of openings in the casing the indications may be seen from the four sides of the machine. The stop which engages each wheel when it has moved its full extent is a pin 60 on the plate 47 that extends into the opening in the wheel and engages the wall of the opening.

It will be understood that after the cash drawer is opened the keys are operated and the indicating wheels are thereby turned so as to show the amount of the sale or transaction, and the indicating wheels are then left in this position until the machine is to be again operated for indicating the next transaction. It will also be understood that the keys may be operated in any order so that either indicating wheel may be first turned, but we prefer to provide means which we have described hereinafter, which prevent more than one key slide from being operated at the same time and consequently the indicating wheels must be turned one after another. We also provide means, which upon the opening of the cash drawer, raises the rod 51 and releases all of said indicating wheels and permits them to be turned to their normal positions in which each wheel shows a blank or zero at the opening in the casing.

Simultaneously with the releasing of these wheels the bars 27, which we have before described as being arranged to operate the registering wheels, are released and returned to their normal positions by the springs 29, and the wheel or roll that carries the strip of paper or ribbon upon which the permanent record is made is turned so as to partially wind up the paper and bring another part of the strip into position for receiving an impression. We also provide means that when the cash drawer is open locks it in its open position and holds it in this position until it is released by operating the last or final key slide. We will now proceed to describe the mechanism that we use for this purpose.

The cash drawer is provided with a plate 73, Figs. 1, 2, 3, 5, and 6, having preferably a depression or recess 75 and also preferably with a projection or finger 77. This plate is preferably arranged so as to be substantially flush with the top of the cash drawer, and this plate may preferably be arranged at the back part of the drawer or at a point back of the money receptacle. A lever 79 is pivoted upon the frame of the machine and its lower end projects down into the top of the cash drawer so that when said cash drawer is open said lever is engaged by the plate 73 and is turned upon its pivot, the lower end of the lever resting upon the top of the plate 73 and riding over said plate until it has passed the end of the finger or projection 77. A lever 81 is pivoted upon one of the standards 21 and this lever is preferably arranged so that its lower end extends down to and is engaged by a pin 83 upon the lever 79. The lower end of the rod 51 is provided with a slot 85 that is engaged by the pin 87 on the lever 81 and said rod 51 is also provided with a projection 89 and also with a finger 91. A stirrup or frame 93 is pivoted to the standard 21, and a spring 95 is connected to the lower end of said stirrup and tends to draw it toward said standard 21. When the rod 51 is in its lowest position the stirrup 93 is held against the side of the projection 89 on said rod. When said rod is raised, as hereinafter described, the stirrup is drawn under the projection 89 and said rod is held in its upper or raised position until said stirrup is moved from under said projection 89. The lever 81 is turned upon its pivot by the movement of the lever 79 in opening the cash drawer, and the pin 87 on said lever 81 raises the rod 51 thereby raising all of the dogs from the indicating wheels and releasing said wheels and permitting them to be turned back to zero. At the same time as the stirrup 93 is turned under the projection 89 said rod is held in its raised or elevated position until the next movement of one of the key slides, when the stirrup 93 is engaged by one of the uprights 55 and is thereby swung out from under the projections 89 on said rod 51 thereby releasing said rod 51 permitting it to fall of gravity and permit its spring dogs 50 to engage the ratchets on the indicating wheels. Each of the sliding ratchet bars 27 is provided with a series of notches 97, and a pawl 99 is also provided for each of said bars. The pawls 99 are pivoted upon a frame 101 arranged upon the standards 21, and each of said pawls is provided with a projection 103 that is engaged by the finger 91 on the rod 51.

When the rod 51 is raised as hereinbefore described all of the said pawls 99 are raised out of engagement with the notches 97 on the bars 27 and the springs 29 return said bars to their original or normal positions. The lever 81 is also provided with a pawl 105 that engages the ratchet wheel of the paper or ribbon feeding device, and when the lever 81 is moved from the position shown by full lines to that shown by dotted lines in Fig. 5 said pawls turn said ratchet wheel a sufficient distance to move the paper and bring a new part thereof into position to receive an impression from the type or printing device hereinafter described. Said pawl 105 is also preferably provided with an arm 106 carrying a pin 107 that rests upon the stationary guide 109. By this means the pawl 105 is supported even when the ratchet wheel is removed as hereinafter explained.

The registering wheels 23 as before stated are preferably mounted upon standards 25 and said standards are secured upon a slide or drawer 111, Figs. 1, 2, 3 and 7, that is arranged in ways in the standards 21. Said slide or drawer is inserted through an opening in the casing 3 and it is preferably secured in position by any suitable means, and said slide may be withdrawn thereby bringing with it the registering wheels and also the recording strip. This recording strip 113, Fig. 3, is wound upon the roll 115 and passes thence over a roll 117 arranged beneath the sliding bars 27, and thence to a spool 119 that is provided with the ratchet wheel 121 that is engaged by the pawl 105 hereinbefore referred to. The recording strip is drawn off from the roll 115 and wound upon the spool 119 by the operation of the lever 81 and pawl 105. The roll 115 and the spool 119 are both arranged in slotted bearings in a frame 123, that is pivoted preferably upon the standards 25 on said slide 111. See Fig. 1. The roll 117 which is preferably provided with a rubber or elastic surface is also mounted upon the frame 123, and this roll comes as before stated directly beneath the bars 27. The frame 123 is provided with a projection 125 that extends through the slide 111 and beneath said projection is the end of a bell crank lever 127, the lower end of said lever projecting below the top of the cash drawer into position to be engaged by the plate 73 as the cash drawer is closed.

Each of the sliding bars 27 is provided with a series of type 129, Figs. 1, 3 and 19, upon its lower surface said type being preferably figures running upon each bar from 0 to 9. One of the types upon each bar is always directly over the roll 117. When the bar is in its normal position the 0 is in position over said roll. When the key numbered 1 is operated the type "1" on said bar is brought over said roll and so on. So that after the key slides have been moved to indicate and register any desired numbers indicating a sale or other transaction, the corresponding types on the bars 27 will all have been brought directly over the roll 117.

It will be remembered that when the machine is operated to indicate and register any sale or transaction the cash drawer must be open. Then when the cash drawer is closed the lever 127 is operated by engagement with the plate 73 and the frame 123 is raised so as to move the roll 117 and the recording strip passing over it directly against the type on the bars 27. In this way a permanent record or impression of the amount of the sale or transaction last registered will be made upon said strip, and as before stated, one key slide is preferably provided having a series of keys marked with letters or characters that are intended to designate the clerk or salesman operating the machine, or its characters may be used to indicate any other desired matter that it is advisable to print upon said record. As for example, the different keys may indicate different kinds of transactions whether they are debit or credit or they may indicate different kinds or classes of merchandise. For example, one key may be used to indicate a sale of drugs, another key a sale of cigars or tobacco. In this way as said last named key slide is operated the corresponding bar 27 will be moved so as to bring the type corresponding to the character on the key by which said slide is moved into position for printing upon a recording strip. It will be understood, however, that this key slide may be omitted from the machine if desired without departing from our invention. It will also be understood that no indicating wheel need be used in connection with said slide and in the drawings we have shown no wheel in connection with said slide. Nor is any registering wheel necessary with said slide and we have not shown any in the drawings.

The frame 123 and the standards 25 as before stated, are all preferably secured upon the slide 111 so that at any time this slide may be withdrawn from the machine for the purpose of inspection, and the total of the sales or transactions may then be seen by examination of the registering wheels, and the recording strip may be examined or it may be removed from the machine and another one put in its place. When it is desired to put these parts back into the machine it is simply necessary to close the drawer or slide and all of the parts will be returned to an operative position.

As before stated we also provide means for locking the cash drawer when it is open and holding it open until the indicating key slide is operated. When this slide is operated the cash drawer is released and closes and simultaneously all of the key slides are locked and no one of them can be moved again until the cash drawer is again opened. For this purpose, as before stated, the cash drawer is provided with a depression or recess 75 and a pivoted frame 131, Figs. 1, 3, 4 and 5, is arranged above said cash drawer being preferably pivoted upon one of said standards 21. This frame when unsupported drops down and rests upon the top of said cash drawer, and when the drawer has been opened to its full limit the lower end of the frame drops into the recess or depression 75 and locks said drawer in an open position. This frame cannot be raised from said drawer and the drawer cannot therefore be released until the last indicating key slide has been operated when the frame 131 is raised so as to be free from the top of the cash drawer. A pivoted stop 133 provided with a projection 135 drops forward so as to carry said projection under a shoulder on said frame and thereby holds said frame in its raised position. The stop 133 is connected by the link 137 with the lever 81, so that when the cash drawer is opened and the lever 79 is operated the stop 133 will be drawn away from the frame 131 and said frame will drop down and rest upon the top of the cash drawer, and when the cash drawer has been opened to its limit said frame will engage the depression 75 and lock said drawer in an open position. Said frame 131 also carries a cross bar 139 and when said frame 131 is raised said cross bar is brought into line with the key bars 18 and locks all of said bars so that none of the keys or key slides can be moved. When said frame drops down into the depression 75 in the top of the cash drawer said bar is carried out of line with said slides and any one of them may then be moved. As before stated said frame is released as the cash drawer is opened and when the drawer has been opened to its full limit said frame releases the keys and locks the cash drawer. It is therefore necessary to completely open the cash drawer and thus to return the indicating wheels and the bars that operate the registering wheels and that carry the type for the recording device, so that they may all be set at zero before any one of the keys can be moved.

We have before stated that we provide means whereby upon the operation of the indicating key slide the cash drawer will be released. This device is shown more especially in detail in Fig. 4. The frame 131 is provided with a pin or lug 141 that when said frame is given its lowest position rests upon a tripping dog 143.

The indicating key slide carries a spring dog 145 and when said key slide is moved inward the lower end of the spring dog 145 passes the upper end of said tripping dog 143. When the key slide returns to its normal position the dog 145 engages the dog 143, turns said dog upon its pivot, raises the frame 131, releases said cash drawer and permits it to be closed by the spring 11. While we have described this means for releasing the cash drawer as being connected with an indicating key slide it will be understood that it may readily be connected with any one of the other slides in case the indicating key slide is omitted, the key slide with which it is connected being of course the one that will be last operated. We also prefer to provide means which makes it impossible to operate more than one of said key slides at a time. The device we prefer to use for this purpose is shown in detail in Figs. 12 and 13 and is also shown in the plan view in Fig. 7. This device consists of a slide or frame 147 having a series of grooves 149. These grooves are of different widths and extend across said slide. The slide is arranged to have a limited longitudinal movement, being held in position by studs 151 that pass through slots 153 in said slide. Each of the key slides is provided at its end with a projection 155, Figs. 3 and 12, said projections having inclined cams 157 arranged directly opposite the ends of the said grooves 149. The grooves 149 are of different widths as before stated, and at the end of each groove are provided the oppositely inclined surfaces 159 and 161. Said surfaces correspond to the cam surfaces upon the projections 155. The edge of the cam 157 is directly opposite the end of the inclined surface 161 and as any one of said key slides is operated the slide 147 is given a slight longitudinal movement by the engagement of the cam 157 with the inclined surface 159. This movement of the slide carries the ends of the grooves away from all of the other projections on the key slides and brings an unbroken portion of the said slide 147 opposite each of said projections, thereby making it impossible to move any one of said slides until the slide 147 has been returned to its normal position. The projection 157 upon the last or indicating key slide need not have any cam surfaces. This may be simply a straight projection that moves into the groove 149 and thereby locks the slide 147 thus preventing any movement of the other key slides. We also prefer, for the purpose of preventing a rapid movement of the key slides, to provide an air cushion common to all of said key slides though of course if preferred a separate air cushion could be provided in each of said slides. As here shown we have arranged an air cylinder 151, Figs. 1, 2, 3 and 7, in the casing 3 and provided a piston 155' having a valve 157, and a small outlet opening 159. A rod 161' is connected to this piston, and this rod is connected to the cross bar 163 that extends across the machine in position to be engaged by each one of said key bars 18. A spring 165' is arranged in connection with said piston rod 161' and holds said piston rod and piston in their normal positions. The valve 157 opens to permit the air to enter as the piston is moved out in the cylinder.

When any one of the keys is operated the valve 157 closes and the air in said cylinder must escape through the opening 159, and as this must escape slowly a cushion is formed for each one of said key slides.

In some instances we prefer to provide a pivoted slide 20 as shown in Fig. 19 a spring 22 being connected to each of said slides to hold it in its normal position as in the other instance. In this instance we provide a key bar 18 with a series of steps which form the keys 15. We also provide the front of the casing with corresponding steps 16 and with the slots through which the key bar 18 projects, Fig. 20. The uprights 55 by which the indicating wheels are operated may in this instance be formed in one casting with the key slides 20 and key bars 18, and the arms 33 that engage the ratchet bars 27 may also be formed integrally with said key slides. The operation of the parts in this instance will be substantially the same as in the other construction except that the slides will move downward being depressed by placing the finger upon the appropriate key 15 and moving the key slide until the finger comes in contact with the corresponding step 16. The projections 155 will in this instance be arranged upon the lower part of the key bars 18, and the slide 147 for locking the said key bars and slides may be arranged with a slightly graduated upper surface and be secured upon a suitable support 148 in the lower part of the casing 3, as shown in Fig. 19.

Instead of using the registering device operated by the sliding ratchet bar 27 we may, if preferred, employ registering or adding devices with an indicating wheel that will show through a suitable opening in the casing the total of the indications that have been made by said wheel. This device we have shown in detail in Figs. 14, 15, 16, 17, and 18. As here shown the key slide 20 is provided with an upright or arm 163 and an adding wheel 165 is arranged beneath the indicating wheel 37. The adding wheel is preferably provided with a series of notches 167 and the indicating wheel is provided with a lug 169 that may be engaged with any one of said notches. The upright 163 is provided with a cam or projection 171 and when said key slide is in its normal position said cam engages the wheel 165 and raises it so as to free the notches 167 from the lug 169. At each time however, that the key slide is moved inward the wheel 165 is released and drops down so that the notch 167 engages the projection 169 and said adding or registering wheel 165 is then moved with the indicating wheel. As soon, however, as the slide is released the registering wheel is again raised and released from the indicating wheel and the indicating wheel may be returned to zero while the registering wheel remains in the position into which it has been moved.

The registering wheel as we have here shown, is provided with numbers running from 1 to 40, and an opening in the casing is provided through which one of said numbers is exposed. A slide 173 is arranged within the casing and this slide is provided with numbers beginning with 40 and running in arithmetical progression with a difference of forty. The registering wheel is provided with lug or projection 175 and the slide 173 is provided with a series of inclined lugs 177. At each revolution of the registering wheel said slide is engaged by the lug 175 and the slide is raised so as to show the next number at an opening in the casing. A dog 179, Fig. 14, engages said projections 177 and holds said slide in position. To know at any time the total of the indications of said wheel 37 it is only necessary to add together the exposed number on the registering wheel and the exposed number of said slide and the total will be the total of the indications that have been made by said wheel.

For the purpose of showing which figures are to be added we may omit from the slide 173 in each number the units figure or character, and we may mark the tens figure in each number on the registering wheel in a different color from the units figure, and we may mark the tens figure in each number on the slide in the same color as the tens figure in number on the wheel. In this way it will be seen that all that is necessary to get the total registration is to add the tens figure on the number shown on the wheel to the tens figure of the number shown on the slide, the units figure of the number shown on the wheel being taken as the units figure of the total.

The general construction and operation of the machine will be readily understood from the foregoing detailed description. We will, however, recapitulate the operation of the machine, it being supposed that the cash drawer is closed, the indicating wheels set to indicate the amount of the last preceding sale or transaction, and all of the key slides being locked.

We will suppose, for instance, that it is desired to register a sale or transaction represented by the figures 1265, which in the case of a sale would represent twelve dollars and sixty-five cents, and that this transaction is to be registered by a clerk whose indicating wheel is E or that the kind of goods or character of the transaction is to be indicated by the letter E on the permanent record. The cash drawer will first be opened and it must be drawn out to its full extent, and as it is opened the lever 79 will be engaged by the plate 73. The lever 81 will thereby be raised, the spool carrying the recording strip will be turned by the pawl 105, and the rod 51 will be raised moving the dogs 50 out of engagement with all of the ratchets on the indicating wheels 37, and the springs of said wheels will return all of said wheels. The dogs 99 will by the movement of the rod 51 be raised out of engagement with the notches on the bars 27 and all of said bars will be returned to their normal positions by the springs 29 and the stirrup 93 will engage and hold up the bar 51, the stop 133 will be moved out of engagement with the frame 131 and said frame will be permitted to drop down and rest upon the top of the cash drawer, and when it enters the depression 75 the bar 139 will be brought out of line with the key bars unlocking said bars. The machine is now in position for the operation of the key bars. The key bars may be operated in any order. The left hand bar will be moved by moving the key numbered 1, and as this bar is moved the corresponding key slide is moved thereby carrying the stirrup 93 out from under the depression 89 on the rod 51. Said rod immediately drops down bringing all of the bars into engagement with the ratchets on the indicating wheels. The corresponding indicating wheels are turned so as to bring the figure "1" opposite each of the appropriate openings in the casing. The dogs 99 having been released by the dropping of the rod 51 will engage the bar 27 corresponding to the left hand key slide, said bar being moved by the movement of the key slide and turning the registering wheel the proper distance to register the numbers indicated by the key that is operated. The dog 99 will engage this bar and hold it in the position into which it is moved with the type corresponding to the key that has been moved directly over the printing wheel. This movement will be repeated with each of the other key slides until the last one which we have called the indicating key slide is operated. When this slide is operated it simply moves the corresponding bar 27 into position to bring the type corresponding to the key in the instance that we have supposed being the key marked E, over the printing wheel. As the indicating slide is released it returns to its normal position and raises the frame 131, releases the cash drawer which is closed. As it closes the lever 127 is engaged by the plate 73 which raises the frame 123 and brings the recording strip against all of the type on the bars 27. As soon as the cash drawer is closed all of the key bars are locked and the machine cannot be operated again until the cash drawer is again opened to its full extent.

With this machine it is practically impossible to "beat the machine." Before the machine can be operated at all the cash drawer must be opened to its full extent. Then only one key bar can be operated at a time and this key bar must be moved a sufficient distance after the indicating wheel is operated to operate the registering and recording bar thereby turning the registering wheel and bringing the type on the bar into position for printing. When the amount has been registered the indicating slide must be moved before the cash drawer can be closed or before any one of the slides can be again operated and when this slide is moved the cash drawer automatically closes making a permanent record of the transaction and all of the keys are again locked.

We claim as our invention—

1. In a cash register, the combination, with the registering mechanism and the operating keys, of a lock for all the keys, and connecting mechanism between the lock and one of the keys or sets of keys whereby the lock is set upon the return of said key to its normal position, substantially as described.

2. The combination, in a cash register, with the registering mechanism and the operating keys, of a cash drawer, a lock for holding the drawer open and for locking the keys in their normal position, and a connecting mechanism between the keys of one set or series and the said lock, whereby upon the return of the operated key of the said series to its normal position the drawer is released and all the said keys are locked, substantially as described.

3. In a cash register, the combination, with the registering mechanism and the operating keys, of a cash drawer, a lock for holding said drawer in an open position and for locking the keys in their normal position, and means for operating said lock, substantially as described.

4. In a cash register, the combination, with the registering mechanism and the operating keys, of a cash drawer, a locking mechanism for locking the keys in their normal position when the drawer is closed, a connection between the last operated key and such mechanism for setting it to lock the keys, and mechanism operated by the opening of the drawer for unlocking the keys, substantially as described.

5. In a cash register, the combination, with the registering mechanism and the operating keys, of a cash drawer, a lock for locking the drawer and for locking all the keys in their normal position when the drawer is closed, and mechanism operated by the opening of the drawer for releasing the keys and setting the lock to hold the drawer open, substantially as described.

6. In a cash register, the combination, with the registering mechanism and the operating keys, of a cash drawer, a lock for locking said drawer in its open position, and for locking the keys in their normal position when the drawer is closed, an operative connection between the last operated key and the said lock for operating it to release the drawer and to lock the keys, and mechanism operated by the opening of the drawer for releasing the keys and setting the lock to hold the drawer open, substantially as described.

7. In a cash register, the combination, with the registering mechanism, the operating keys and the cash-drawer, of a gravitating lock for locking the keys in their normal positions, a catch for holding the said lock in operative position, a trip mechanism operated by the opening of the drawer for withdrawing the catch to let the said lock fall and release the keys, and mechanism for restoring the lock to position after all the keys have been operated, substantially as described.

8. In a cash register, the combination, with the registering mechanism, the keys for operating such mechanism, of a special recording key to be operated after the said operating keys, a locking mechanism for the said keys to hold them in their normal position and operative connections between said special recording key and the locking mechanism whereby the operation of the former sets the latter, substantially as described.

9. In a cash register, the combination, with the casing, provided with the inclined wall, of the registering mechanism, the key slides arranged within said casing and provided with the inclined key bars also arranged within said casing, of the series of keys of different lengths secured to said key bars and projecting through the inclined wall of the casing, whereby said key slides may be moved different distances for different keys, substantially as described.

10. In a cash register, the combination, with the registering mechanism and its inclosing casing, of the keys, the cash-drawer, means for locking said cash-drawer in its open position, operative connections, between the keys of one series only and the drawer-locking means, to release said cash-drawer, and means for locking all of said keys, substantially as described.

11. In a cash register, the combination, with the keys arranged in series, of the cash drawer, a lock for holding said cash drawer in its open position, a spring for closing said cash drawer, and mechanism connecting the keys, of one series only, with the said drawer lock for releasing said cash drawer, substantially as described.

12. In a cash register, the combination, with the indicating and registering mechanism, of a recording mechanism, keys by which said indicating and registering mechanisms and the said recording mechanism are all operated, a series of keys by which the recording mechanism, but not the indicating and registering mechanisms, is operated, a lock for all the said keys, and means operated by the last said series of keys for setting the said lock, substantially as described.

13. In a cash register, the combination, with the indicating, registering and recording mechanism, of keys by which all of said mechanisms are operated, keys by which the recording mechanism alone is operated, the cash drawer, means for locking all of said keys and said cash drawer, and means for locking said keys as the drawer is closed.

14. In a cash indicator, the combination, with a series of indicating wheels, a vertical standard upon which said wheels are mounted, of a circular casing inclosing said wheels provided with openings arranged in a diagonal line for exposing the characters upon said wheels, substantially as described.

15. In a cash indicator, the combination, of a series of indicating wheels, a vertical standard upon which said wheels are arranged, means for operating said wheels, and a circular casing inclosing said wheels and provided with several series of openings arranged in inclined rows, substantially as described.

16. In a cash register and indicator, the combination, with the indicating wheels, of springs for returning them to their normal position, keys and key-slides for moving the wheels and having loose connections therewith whereby they can move independently of the wheels, the stops for limiting the movement of the wheels and preventing their moving farther than the said keys positively move them, means for locking and holding the wheels in the position to which they are moved by the keys, independent of the keys and key-slides, whereby the latter may be made to turn the wheels and be returned to their position without interference therefrom, and mechanism independent of the keys for releasing the wheels from their locking or holding devices, substantially as described.

17. The combination, in a cash register, with the indicating wheel 37, of the key-slide provided with an upright or arm, the link 59 connecting said upright with said wheel and provided with the slot 61 and the projection 71, and the series of stops 69, substantially as described.

18. The combination, in a cash indicator, of the series of indicating wheels, of the stationary post on which the wheels are mounted and turn, the stationary plates 47 secured to said post and arranged between the wheels, the springs which tend to return the wheels to their normal position, the ratchets 49 on the wheels, the pawl 50 supported by the said plates 47 and arranged to engage with the said ratchets, means for moving the wheels, and means for disengaging the pawls and permitting the wheels to be returned to their normal position by said springs, substantially as described.

19. In a cash indicator, the combination, with the cash drawer and the indicating wheels provided with ratchets, of the pawls for engaging said ratchets, the reciprocating releasing rod 51 for moving the pawls from the ratchets, a lever 79 operated by the drawer, and the intermediate lever 81 situated between the lever 79 and the reciprocating releasing rod 51 whereby the latter is operated upon the moving of the cash drawer in one direction, substantially as described.

20. The combination, with the indicating wheels, the cash drawer, and the key-slides, of the releasing rod 51, the levers 79 and 81 for operating the releasing rods upon the opening of the cash drawer, and the stirrup 93 arranged to engage and hold said rod 51 in its elevated position, and to release said rod upon the operation of any of said key-slides, substantially as described.

21. The combination, with the key-slides and the key-bars, of a pivoted frame which operates as a lock for all the key slides and bars when in their normal position, a cash drawer provided with a recess into which the said frame can fall when the drawer is opened, and means for unlocking the key-slides and bars as the drawer is opened, substantially as described.

22. The combination, with the key-slides and key-bars, of the pivoted frame for locking said key-bars and key-slides, a cash drawer provided with a recess into which said frame moves when the cash drawer is open, thereby releasing the key bars and slides, means operated by one or more of said keys for disengaging said frame from the cash drawer and thereby permitting said cash-drawer to close, substantially as described.

23. The combination, with the operating bars and the cash-drawer provided with the recess 75, of the pivoted frame 131 arranged to engage with said recess and lock the drawer when it is open, and to lock all of the operating keys in their normal position when the drawer is closed, and means for restoring the frame to position to lock the keys and unlock the drawer after the keys have been operated, substantially as described.

24. The combination, with the cash-drawer and key-bars, of the pivoted frame 131, the stop 133 provided with the lug 135, the levers 79 and 81, and the link 137 connecting said lever 81 with said stop 133, substantially as described.

25. The combination, with the pivoted frame 131 and the cash-drawer having the recess 75, of the trip 143 and the key-bar provided with the pawl or dog 145 adapted to engage said trip for the purpose set forth.

26. The combination, in a cash register, with the key-slides, of a series of ratchet-bars adapted to be engaged and moved by said slides when moving in one direction only, a series of keys for each of said slides, said keys being adapted to move said slides different distances, registering wheels engaged by said ratchet bars, the pawls for holding the slides after they are moved, and means for releasing the slides from the pawls before they are again operated, substantially as described.

27. The combination, in a cash register, with the registering ratchet-wheels 23, of the sliding ratchet-bars 27 adapted to engage said wheels and having the projections 35, the key-slides provided with the arms 33 adapted to engage with the projections 35 on said bars, and a series of keys for each of said slides, said keys being arranged to move said slides different distances, substantially as described.

28. In a registering and recording mechanism, the combination with a movable slide, of registering and recording mechanisms mounted on said slide, and operating devices arranged to engage said registering and recording mechanisms when the slide is in its normal position, substantially as described.

29. In a registering and recording mechanism, the combination, with the sliding-bars 27 provided with the ratchet-teeth, and with a series of types or characters, and means for moving said bars, of a removable slide, a series of registering wheels, and a recording strip arranged upon and carried by said slide, for the purpose specified.

30. In a recording mechanism, the combination, with the sliding bars 27 provided with a series of types or characters, of the removable slide 111, and mechanism arranged upon said slide and carrying a recording strip adapted to receive impression from the types or characters upon said bar 27, substantially as described.

31. In a registering and recording mechanism, the combination, with the movable bars 27 provided with the types or characters, the slide 111, the pivoted frame 123 arranged upon said slide, and carrying the roll 115, the spool 119 and the roll 117, of means operated by the movement of the cash drawer for bringing said recording strip against the type or characters on said bars 27, substantially as described.

32. In a cash register, the combination, with the registering wheels, of the sliding registering bars 27, springs for returning said bars to their normal positions, a series of key slides, a series of keys for operating each of said slides, said keys being arranged to move said slides different distances, means for locking said sliding-bars 27 in the positions to which they are moved by said keys, and means for releasing all of said sliding-bars upon the opening of the cash-drawer and permitting them to be returned to their normal positions by the operation of said springs, substantially as described.

33. In a cash register, the combination, with the series of key-slides provided with the projection 155 having cam surfaces 157, of the slide 147 provided with the grooves 149 and the cam surfaces 159 and 161, for the purpose set forth.

In testimony whereof we have hereunto set our hands this 22d day of October, 1891.

PETER J. LANDIN.
FLETCHER L. WALKER.

In presence of—
A. C. PAUL,
BESSIE BOOTH.